United States Patent
Bertollini et al.

(10) Patent No.: US 9,605,751 B2
(45) Date of Patent: Mar. 28, 2017

(54) AUTOMATIC CONTROL OF A PARK MODE IN A MOTOR VEHICLE

(71) Applicant: GM GLOBAL TECHNOLOGY OPERATIONS LLC, Detroit, MI (US)

(72) Inventors: Gary P. Bertollini, Lake Orion, MI (US); Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 14/791,594

(22) Filed: Jul. 6, 2015

(65) Prior Publication Data

US 2017/0009878 A1 Jan. 12, 2017

(51) Int. Cl.
*F16H 59/60* (2006.01)
*F16H 61/02* (2006.01)

(52) U.S. Cl.
CPC ................................ *F16H 61/0204* (2013.01)

(58) Field of Classification Search
CPC .................................................. F16H 61/0204
See application file for complete search history.

(56) References Cited

U.S. PATENT DOCUMENTS

| | | | | |
|---|---|---|---|---|
| 6,139,117 A | * | 10/2000 | Shirai | B60T 13/74 188/1.11 R |
| 2002/0007979 A1 | * | 1/2002 | Wilson | F16H 59/044 180/292 |
| 2003/0141130 A1 | * | 7/2003 | Fleming | F16H 61/22 180/271 |
| 2007/0204710 A1 | * | 9/2007 | Mandou | F16H 59/0204 74/335 |
| 2014/0129098 A1 | * | 5/2014 | Ohbayashi | B60W 50/087 701/51 |

* cited by examiner

*Primary Examiner* — David J Hlavka
(74) *Attorney, Agent, or Firm* — Quinn Law Group, PLLC

(57) ABSTRACT

A method is disclosed for controlling a park mode in a motor vehicle that includes a powertrain with a powerplant. The method includes identifying whether the vehicle is stopped. The method also includes identifying whether the powerplant is operating or is turned off. The method additionally includes identifying whether an operator of the vehicle is present inside or has vacated the vehicle. The method also includes commanding automatic selection of the park mode if the powerplant is turned off. Furthermore, the method includes commanding automatic selection of the park mode if the operator has vacated the vehicle, whether the powerplant is turned on and operating, or is turned off. The powertrain may include an automatic transmission operatively connected to the powerplant, and the park mode can be affected inside the transmission. A system for controlling such a powertrain via a controller programmed to execute the method is also disclosed.

20 Claims, 2 Drawing Sheets

AUTOMATIC CONTROL OF A PARK MODE IN A MOTOR VEHICLE

TECHNICAL FIELD

The disclosure relates to automatic control of a park mode in a vehicle employing a powertrain.

BACKGROUND

Modern passenger, recreation, and work vehicles, such as passenger cars, trucks, tractors, etc., generally include a powertrain with a powerplant, such as an internal combustion engine and/or an electric motor, a transmission, such as a multi-speed automatically-shiftable or automatic transmission, and a differential or final drive. An automatic multi-speed transmission increases the overall operating range of the vehicle by permitting the engine to operate through its torque range multiple times without requiring an operator of the vehicle to manually select specific speed-ratios or gear ranges in a forward or drive mode. Such powertrains typically also provide a reverse mode permitting the powerplant to move the vehicle in a direction opposite to the drive mode, and a park mode which operates to block vehicle movement.

Modern powertrains are typically controlled by specifically programmed electronic controllers. Thus programmed, the controller generally uses data provided by sensors from various vehicle systems to, for example, deliver fuel and air and time the spark in the internal combustion engine, and determine how and when to change gears in the transmission for optimum vehicle performance, fuel economy, and shift quality. Although such a controller is generally programmed to automatically control the powertrain in the drive mode, selection between drive, reverse, and park modes is typically reserved for the vehicle operator.

SUMMARY

A method for controlling a park mode in a motor vehicle that includes a powertrain with a powerplant is disclosed. The method includes identifying whether the vehicle is stopped. The method also includes identifying whether the powerplant is operating, or is turned off. The method additionally includes identifying whether an operator of the vehicle is present inside or has vacated the vehicle. The method also includes commanding automatic selection of the park mode if the powerplant is turned off. Furthermore, the method includes commanding automatic selection of the park mode if the operator has vacated the vehicle, whether the powerplant is turned on and operating, or is turned off.

The vehicle may include a first sensor operatively connected to the controller and configured to detect a road speed of the vehicle. In such a case, the act of identifying whether the vehicle is stopped may be accomplished via the controller receiving a signal from the first sensor. The first sensor may be a wheel sensor arranged to detect a rotating speed of the vehicle's road wheel, and the speed of the vehicle being stopped may correspond to the rotating speed of the road wheel being zero.

The powertrain may also include a transmission operatively connected to the powerplant. The transmission may provide the park mode, such that the act of commanding automatic selection of the park mode includes activating the park mode in the transmission.

The transmission may include a park gear and a park pawl. In such a case, the act of commanding automatic selection of the park mode in the transmission may include actuating the park pawl to engage the park gear.

The transmission may additionally include a neutral mode. In such a case, the method may further include overriding the act of commanding automatic selection of the park mode if the neutral mode was selected by the operator.

The powerplant may be an internal combustion engine and the transmission may be a multiple speed-ratio automatically-shiftable transmission.

The vehicle may include a switch configured to selectively turn the powerplant on and off. In such a case, the act of identifying whether the powerplant is turned on and operating, or is turned off, may be accomplished by the controller receiving a signal from the switch. The subject switch may be configured as a pushbutton arranged inside the vehicle to be actuated by the operator of the vehicle.

The vehicle may include a second sensor operatively connected to the controller and configured to detect a presence of the operator inside the vehicle. In such a case, the act of identifying whether the operator is present inside or has vacated the vehicle may be accomplished via the controller receiving a signal from the second sensor. Such a second sensor may be configured as an occupant presence sensor arranged to detect whether the operator's door is open, a sensor arranged in the operator's seat to detect operator weight, or an optical sensing device such as a camera.

A remote communication device, such as a cellular telephone, may be paired with the controller. In such a case, the method may also include communicating to the remote communication device a sensory signal indicative of the powerplant being turned on if the operator has vacated the vehicle. According to the method, the operator can disable such a warning or reminder on the paired device.

The method may additionally include commanding the powerplant to turn off in response to receiving, via the controller, a request from the remote communication device to turn the powerplant off.

The method may furthermore include commanding the powerplant to turn off following a predetermined timespan if no remote communication has been received via the controller.

A system for controlling the park mode via a controller programmed to execute the above-disclosed method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
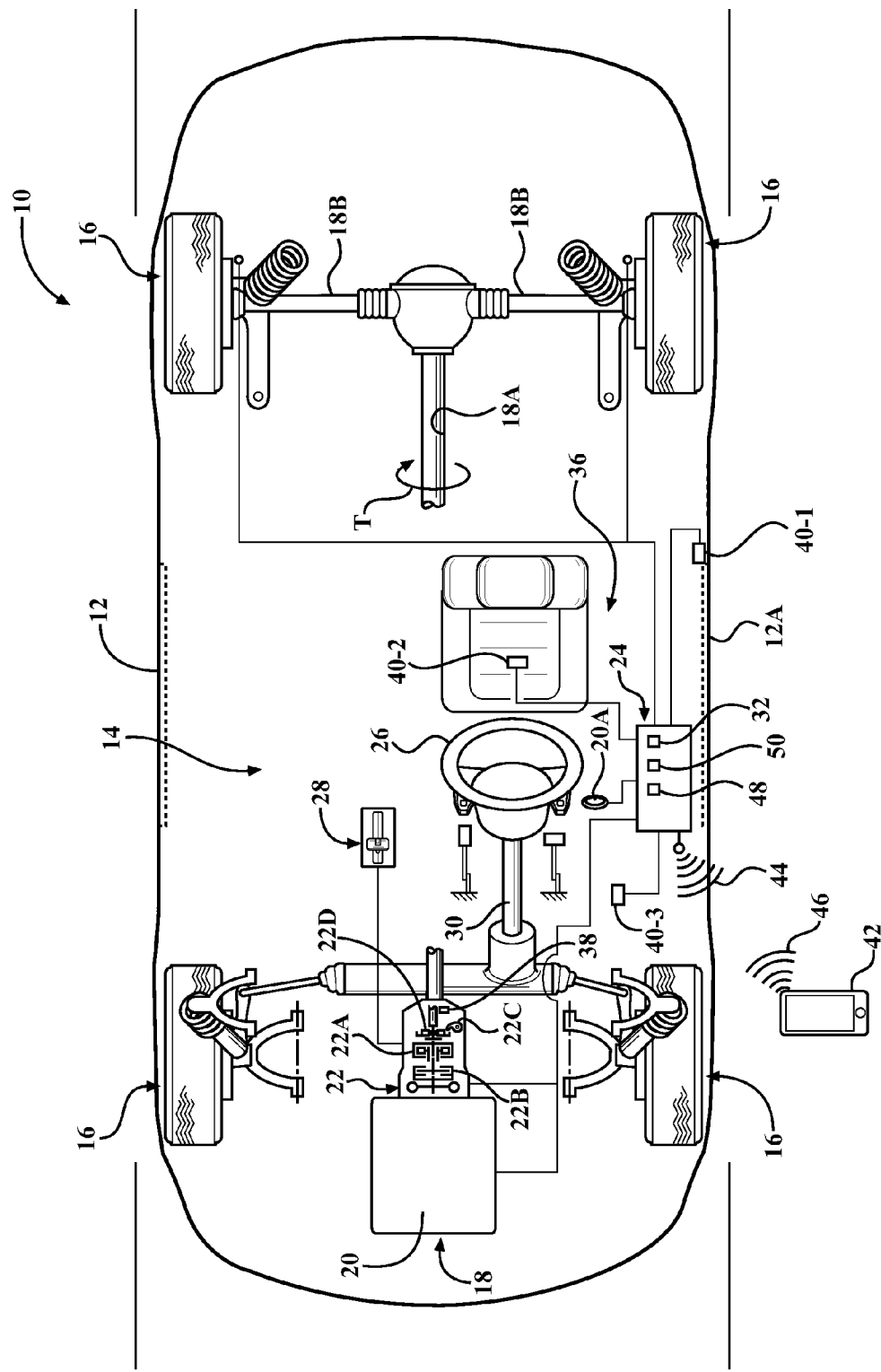
FIG. 1 is a schematic illustration of a vehicle employing a powertrain and a system for controlling a vehicle park mode according to the disclosure.

Referring to the drawings, wherein like reference numbers refer to like components, FIG. 1 illustrates a vehicle 10 that includes a vehicle body 12 that defines a vehicle interior or passenger compartment 14. The vehicle 10 also includes a plurality of road wheels 16 and a powertrain 18 configured to launch and propel the vehicle, i.e., operate the vehicle at various road speeds. The powertrain 18 includes a powerplant 20, which can include an internal combustion engine, one or more electric motors, and/or a fuel cell (not shown), for generating powerplant torque T. The powerplant 20 can be turned on or turned off by an operator or driver of the vehicle 10 via a dedicated switch 20A, generally described as an ignition switch. The vehicle 10 may, for example, be used for transporting passengers and cargo, such as a passenger car, in agriculture or construction, such as a truck or a tractor, or for sports and recreation, such as an all-terrain vehicle or a racecar.

The powertrain 18 can include such devices as a drive shaft 18A, drive axles 18B, and may also include a transmission 22 operatively connecting the powerplant 20 to at least some of the road wheels 16 for transmitting powerplant torque thereto. The transmission 22 may be configured as a multiple speed-ratio automatically-shiftable, a.k.a., automatic, transmission, as understood by those skilled in the art. The transmission 22 can be a planetary gear-train automatic transmission that has input and output members or shafts and one or more planetary gear sets 22A for coupling the input and output shafts. Typically, in such an automatic transmission, a related number of hydraulically actuated torque transmitting devices 22B, such as clutches and brakes. The transmission input shaft is generally selectively connectable to the vehicle powerplant, e.g., through a fluid coupling device such as a torque converter.

Although a planetary gear-train automatic transmission is shown, the transmission 22 can also be a parallel shaft mounted gear-train employing shiftable, i.e., movable, gear elements, such as in a Dual-Clutch Transmission (DCT), for affecting specific transmission speed-ratios. In such a parallel shaft transmission, generally the input shaft(s) are selectively connectable to the vehicle powerplant via automated engagement of one or more torque transmitting devices, typically using either a single- or a dual-clutch arrangement. In general, the torque transmitting devices in any of the above transmissions are selectively engageable for establishing desired forward and reverse speed ratios between the transmission's input and output shafts. The speed ratio is defined as the transmission input speed divided by the transmission output speed. In any of the above transmissions, the output shaft is connected directly to one or more of the vehicle road wheels 16.

The vehicle 10 also includes an electronic control unit (ECU) or controller 24. The controller 24 is operatively connected to the powertrain 18 in order to control and coordinate operation of the powerplant 20 and the transmission 22. Each of the powerplant 20 and transmission 22 may also be separately controlled by a respective powerplant controller and a transmission control unit, which would also be programmed to communicate with each other to affect overall control of the powertrain 18. However, for simplicity, the present disclosure will be limited to describing control of the entire powertrain 18 via the controller 24.

Arranged inside the passenger compartment or vehicle interior 14 are a variety of mechanical, electrical, and electro-mechanical devices configured to control operation of the vehicle and its various subsystems. As shown in FIG. 1, such devices include a steering wheel 26 and a transmission shift selector 28 for controlling operation of the transmission 22. As known by those skilled in the art, the steering wheel 26 is typically rotatably mounted in the vehicle 10 on a steering column 30 and is configured to turn at least some of the wheels 16. Also arranged inside the passenger compartment 14 can be the ignition switch 20A that is configured to selectively turn the powerplant 20 on and off, as discussed above. The switch 20A may be a pushbutton (as shown), a keyed mechanism, or any other type of a device facilitating the operator of the vehicle 10 to control activation of the powerplant 20. When operated, the switch 20A is configured to send a signal that is received by the controller 24 in order to selectively turn the powerplant 20 on or off.

The transmission shift selector 28, which may be a mechanical control lever or electro-mechanical switch, is configured, i.e., designed and constructed, to be manipulated by the operator of the vehicle 10 for selecting among operating modes, speed-ratio ranges, and/or specific speed-ratios of the transmission 22. Specific operating modes of the transmission 22 may include a forward or drive mode in which engine torque can be employed to move the vehicle 10 in one direction, a reverse mode in which engine torque can be employed to move the vehicle in a direction that is opposite to that of the drive mode, and a neutral mode in which no powerplant torque T can be transmitted to the road wheel(s) 16.

The vehicle 10 additionally includes a park mode 32 in which vehicle movement is effectively blocked. Such a park mode 32 may be affected via and inside the transmission 22. For example, the transmission 22 can employ a selectable dog clutch, for example using a park pawl 22C for engagement with a park gear 22D, to thereby lock the input of the transmission with its output to block vehicle movement. Although not shown, the park mode 32 may also be affected by a separate subsystem that interacts with the transmission's drive or neutral modes to block vehicle movement, for example by applying a selectable friction or parking brake at the transmission output, at the driveshaft 18A, at the drive axle(s) 18B, or at one of the road wheels 16.

To facilitate control of the transmission 22, the transmission shift selector 28 may include specific positions corresponding to the above-described operating modes, speed-ratio ranges, and/or individual speed-ratios. Each of the above positions of the shift selector 28 may be defined by a tactile detent to facilitate reliable selection of the corresponding mode by the operator of the vehicle 10. In other words, the transmission shift selector 28 may include predetermined positions that specifically select all the available speed-ratios in drive mode, all the speed-ratios in reverse mode, and individually select the neutral mode and the park mode 32.

The vehicle 10 also includes a system 36 for controlling the powertrain 18. The system 36 includes a first sensor 38 configured to detect a speed of the vehicle 10 and a second sensor configured to detect a presence of the operator inside the vehicle passenger compartment 14. The second sensor can be any of the sensors 40-1, 40-2, and 40-3, as described below. For example, the first sensor 38 can be arranged inside the transmission 22 and configured to detect a rotating speed of the transmission output shaft, or be arranged proximate to one of the road wheels 16 for detecting a rotating speed of the subject wheel. The second sensor can be an operator-position or -presence sensor, for example a vehicle operator's door 12A state or position sensor 40-1 configured to detect whether the door is open or closed, an operator weight sensor 40-2 positioned in the driver's seat, or an optical sensing device 40-3 such as an image detection camera, as shown. Although individual embodiments of the second sensor are depicted in FIG. 1 as the respective sensors 40-1, 40-2, and 40-3, for consistency, hereinafter the second sensor will be referenced generally by the numeral 40.

The controller 24 is in operative communication with each of the first sensor 38, the second sensor 40, and the transmission 22, and configured or programmed to identify whether the vehicle 10 is stopped. The controller 24 may identify whether the vehicle is stopped via receiving from the first sensor 38 a signal corresponding to the speed of the vehicle 10 being zero. The controller 24 is configured to identify whether the powerplant 20 is turned on and operating, or is turned off, such as by receiving a signal from the ignition switch 20A that the subject switch is selected to its off position. The controller 24 is also configured to identify whether the operator of the vehicle is present inside or has vacated, i.e., is not present inside, the vehicle 10 via receiving a signal from the second sensor 40. The controller 24 is additionally configured to command automatic selection of the park mode 32, whether in the transmission 20 or otherwise, if the powerplant 20 was identified as having been turned off. Additionally, the controller 24 is configured to command automatic selection of the park mode 32 if the controller has identified that the operator has vacated the vehicle 10, regardless whether the powerplant 20 is turned on and operating, or is turned off. The park mode 32 may be automatically activated via the controller 24 whether the park mode is generally selected in the transmission 22, via the park pawl 22C and park gear 22D, or externally, such as via the parking brake. The terms "automatic" and "automatically" in the present context denote the controller 24 commanding and affecting performance of specified actions in the vehicle 10 upon occurrence of predetermined conditions, and without receiving external commands with respect to the subject actions.

The controller 24 may be also configured to override the automatic selection of the park mode 32 if the neutral mode in the transmission 22 was specifically selected by the operator. The operator may possess a remote communication device 42, such as a cellular telephone. Such a remote communication device 42 may be paired with the controller 24, and the controller may be additionally configured to communicate to the communication device a sensory signal 44, such as a text message, indicative of the powerplant being turned on, if it has been previously identified that the operator has already vacated the vehicle 10. The operator can also have the option of disabling the receipt of such a sensory signal on the paired remote communication device 42. The controller 24 may be additionally configured to command the powerplant 20 to turn off in response to receiving from the remote communication device 42 a request 46 sent by the operator to turn the powerplant off. The controller 24 may also be configured to command the powerplant 20 to turn off following a predetermined timespan 48 if no remote communication device is paired with the controller, or if no remote communication has been received via the controller.

Figure 2:
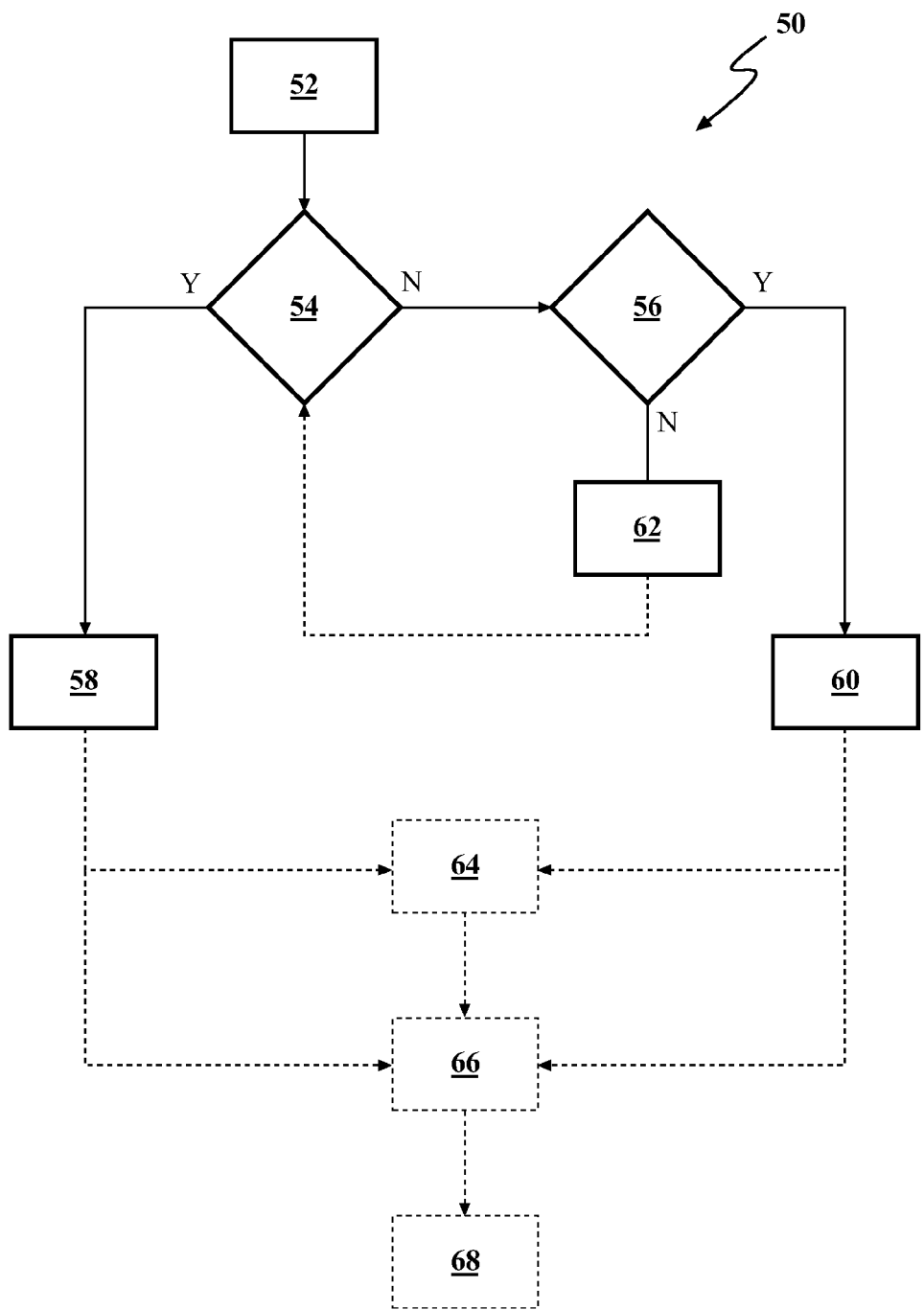
FIG. 2 is a flow diagram of a method for controlling a park mode in the vehicle shown in FIG. 1.

FIG. 2 depicts a method 50 of controlling the park mode 32 in the motor vehicle 10, as described above with respect to FIG. 1. The method 50 is initiated in frame 52 with identifying, via the controller 24, whether the vehicle 10 is stopped. Identifying whether the vehicle 10 is stopped may be accomplished via the controller 24 receiving a signal from the first sensor 38. Following frame 52 the method 50 proceeds to frame 54. In frame 54, the method includes identifying whether the powerplant 20 is turned on and operating, or is turned off. If in frame 54 the method has identified that the powerplant 20 is turned off, the method proceeds to frame 56. If in frame 54 the method has determined that the powerplant 20 remains turned on, the method proceeds to frame 58. In frame 58 the method includes identifying whether the operator of the vehicle 10 is present inside or has vacated the vehicle. If in frame 58 the method has identified that the operator has vacated the vehicle 10, the method proceeds to frame 60. As discussed above with respect to FIG. 1, identification of whether the operator is present inside or has vacated the vehicle 10 may be accomplished via the controller 24 receiving a signal from the second sensor 40.

In either frame 58 or frame 60 the method commands, via the controller 24, automatic selection of the park mode 32. Accordingly, the method includes commanding automatic selection of the park mode 32 via the system 36 whether the powerplant 20 is turned off, or is turned on and operating once the operator has vacated the vehicle 10. In the case that the powertrain 18 includes the transmission 22, as discussed above, the subject transmission can include specific components configured to provide the park mode 32, which would be automatically activated by the controller 24. If, on the other hand, in frame 56 the method has identified that the operator remains inside the vehicle 10, the method proceeds to frame 62 where the controller 24 operates in stand-by mode, does not engage the park mode 32, and may loop back to frame 54 or to frame 52.

Following either frame 58 or 60 the method may proceed to frame 64. In frame 64 the method may include overriding, via the controller 24, the act of commanding automatic selection of the park mode 32 if the transmission neutral mode was selected by the operator, such as for the purpose of towing the vehicle 10. Accordingly, selection of the neutral mode by the operator can be used as a trigger by the controller 24 to override the pre-programmed automatic selection of the park mode 32. Alternatively, following either frame 58 or 60 the method may proceed to frame 66. In frame 66 the method may include communicating to the communication device 42, via the controller 24, the sensory signal 44 indicative of the powerplant 20 remaining turned on if the operator has vacated the vehicle 10. Following frame 66, in frame 68, the method may include commanding the powerplant 20 to turn off in response to receiving, via the controller 24, the request 46 from the remote communication device 42 to turn the powerplant off. Additionally, in frame 68, the method may include commanding the powerplant 20 to turn off, if no communication has been received via the controller 24 from the remote communication device 42 following the passage of the predetermined timespan 48.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a park mode in a motor vehicle including a powertrain with a powerplant, the method comprising:

identifying, via a controller, whether the vehicle is stopped;

identifying, via the controller, whether the powerplant is turned on and operating, or is turned off;

identifying, via the controller, if an operator of the vehicle is present inside the vehicle;

commanding, via the controller, automatic selection of the park mode if the powerplant is turned off; and commanding, via the controller, automatic selection of the park mode if the operator is not present inside the vehicle.

2. The method of claim 1, wherein the vehicle includes a first sensor operatively connected to the controller and configured to detect a speed of the vehicle, and wherein said identifying whether the vehicle is stopped is accomplished via the controller receiving a signal from the first sensor.

3. The method of claim 1, wherein:

the powertrain additionally includes a transmission operatively connected to the powerplant;

the transmission provides the park mode; and said commanding automatic selection of the park mode includes activating the park mode in the transmission.

4. The method of claim 3, wherein the transmission includes a neutral mode, further comprising overriding, via the controller, said commanding automatic selection of the park mode if the neutral mode was selected by the operator.

5. The method of claim 1, wherein the vehicle includes a switch configured to selectively turn the powerplant on and off, and wherein said identifying whether the powerplant is turned on and operating, or is turned off, is accomplished by the controller receiving a signal from the switch.

6. The method of claim 1, wherein the vehicle includes a second sensor operatively connected to the controller and configured to detect a presence of the operator inside the vehicle, and wherein said identifying whether the operator is present inside the vehicle is accomplished via the controller receiving a signal from the second sensor.

7. The method of claim 1, wherein a remote communication device is paired with the controller, further comprising communicating to the remote communication device, via the controller, a sensory signal indicative of the powerplant being turned on if the operator is not present inside the vehicle.

8. The method of claim 7, further comprising commanding the powerplant to turn off in response to receiving, via the controller, a request from the remote communication device to turn the powerplant off.

9. The method of claim 8, further comprising commanding the powerplant, via the controller, to turn off following a predetermined timespan if no remote communication has been received via the controller.

10. A system for controlling a park mode in a motor vehicle including a powertrain with a powerplant, the system comprising:

a first sensor configured to detect a speed of the vehicle;

a second sensor configured to detect a presence of the operator inside the vehicle; and a controller in operative communication with each of the first sensor and the second sensor, and configured to:

identify whether the vehicle is stopped;

identify whether the powerplant is turned on and operating, or is turned off;

identify if an operator of the vehicle is present inside the vehicle;

command automatic selection of the park mode if the powerplant is turned off; and command automatic selection of the park mode if the operator is not present inside the vehicle.

11. The system of claim 10, wherein:

the powertrain additionally includes a transmission operatively connected to the powerplant;

the transmission provides the park mode; and the automatic selection of the park mode activates the park mode in the transmission.

12. The system of claim 11, wherein the transmission includes a neutral mode, and wherein the controller is additionally configured to override the automatic selection of the park mode if the neutral mode was selected by the operator.

13. The system of claim 10, further comprising a switch arranged in the vehicle and configured to selectively turn the powerplant on and off, and wherein the controller is configured to identify whether the powerplant is turned on and operating, or is turned off, by the controller receiving a signal from the switch.

14. The system of claim 10, wherein the second sensor is at least one of a door position sensor, an occupant weight sensor, and an optical sensing device.

15. The system of claim 10, further comprising a remote communication device paired with the controller, wherein the controller is additionally configured to communicate to the remote communication device a sensory signal indicative of the powerplant being turned on if the operator is not present inside the vehicle.

16. The system of claim 15, wherein the controller is additionally configured to command the powerplant to turn off in response to receiving a request from the remote communication device to turn the powerplant off.

17. The system of claim 16, wherein the controller is additionally configured to command the powerplant to turn off following a predetermined timespan if no remote communication has been received via the controller.

18. A system for controlling a park mode in a motor vehicle including a powertrain, the powertrain including a powerplant operatively connected to a multiple speed-ratio automatically-shiftable transmission, the system comprising:

a first sensor configured to detect a speed of the vehicle;

a second sensor configured to detect a presence of the operator inside the vehicle; and a controller in operative communication with each of the first sensor, the second sensor, and the transmission, and configured to:

identify whether the vehicle is stopped;

identify whether the powerplant is turned on and operating, or is turned off;

identify whether an operator of the vehicle is present inside the vehicle;

command selection of the park mode in the transmission if the powerplant is turned off; and command selection of the park mode in the transmission if the operator is not present inside the vehicle.

19. The system of claim 18, wherein the transmission includes a neutral mode, and wherein the controller is additionally configured to override the automatic selection of the park mode in the transmission if the neutral mode was selected by the operator.

20. The system of claim 18, further comprising a remote communication device paired with the controller, wherein the controller is additionally configured to:

communicate to the remote communication device a sensory signal indicative of the powerplant being turned on if the operator is not present inside the vehicle;

command the powerplant to turn off in response to receiving a request from the remote communication device to turn the powerplant off; and command the powerplant to turn off following a predetermined timespan if no remote communication has been received via the controller.

* * * * *